(12) United States Patent
Zhang

(10) Patent No.: US 11,190,527 B2
(45) Date of Patent: Nov. 30, 2021

(54) IDENTITY VERIFICATION AND LOGIN METHODS, APPARATUSES, AND COMPUTER DEVICES

(71) Applicant: Advanced New Technologies Co., Ltd., Grand Cayman (KY)

(72) Inventor: Aihui Zhang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/104,990

(22) Filed: Nov. 25, 2020

(65) Prior Publication Data

US 2021/0084052 A1 Mar. 18, 2021

Related U.S. Application Data

(63) Continuation of application No. PCT/CN2019/091178, filed on Jun. 14, 2019.

(30) Foreign Application Priority Data

Jul. 18, 2018 (CN) .......................... 201810791637.5

(51) Int. Cl.
*H04L 29/06* (2006.01)
(52) U.S. Cl.
CPC ............ *H04L 63/12* (2013.01); *H04L 63/105* (2013.01)
(58) Field of Classification Search
CPC .............................. H04L 63/12; H04L 63/105
See application file for complete search history.

(56) References Cited

U.S. PATENT DOCUMENTS 7,428,750 B1 * 9/2008 Dunn ...................... G06F 21/41
726/8
9,491,155 B1 * 11/2016 Johansson ............ G06F 21/604
(Continued)

FOREIGN PATENT DOCUMENTS

CN 101399813 A 4/2009
CN 101453328 A 6/2009
(Continued)

OTHER PUBLICATIONS

International Search Report in Application No. PCT/CN2019/091178, from the China National Intellectual Property Administration (ISA/CN), dated Sep. 6, 2019.
(Continued)

*Primary Examiner* — Joseph P Hirl
*Assistant Examiner* — Stephen T Gundry
(74) *Attorney, Agent, or Firm* — Finnegan, Henderson, Farabow, Garrett & Dunner, LLP

(57) ABSTRACT

A login method includes: after a login process of a service apparatus is triggered, acquiring verification information of a target primary account, and sending the verification information to an identity management apparatus; after receiving the verification information by the identity management apparatus, performing identity verification on the target primary account by using an identification information set of a registered primary account, and after the identity verification is passed, acquiring login information of at least one sub-account associated for the service apparatus in advance with the target primary account and sending the login information to the service apparatus; and determining, by the service apparatus, a target sub-account based on the login information and logging in to a server side.

15 Claims, 14 Drawing Sheets

(56) References Cited

U.S. PATENT DOCUMENTS

| | | | |
|---|---|---|---|
| 9,705,868 B2* | 7/2017 | Thun | H04L 63/0853 |
| 10,116,447 B2* | 10/2018 | Gordon | H04L 9/3231 |
| 2004/0128558 A1* | 7/2004 | Barrett | G06F 21/31 |
| | | | 726/8 |
| 2006/0218630 A1 | 9/2006 | Pearson et al. | |
| 2013/0007840 A1 | 1/2013 | Sabin et al. | |
| 2013/0174244 A1* | 7/2013 | Taveau | G06Q 20/12 |
| | | | 726/9 |
| 2013/0198818 A1* | 8/2013 | Hitchcock | H04L 63/08 |
| | | | 726/5 |
| 2014/0075516 A1* | 3/2014 | Chermside | H04L 63/061 |
| | | | 726/4 |
| 2014/0157381 A1* | 6/2014 | Disraeli | H04W 4/02 |
| | | | 726/7 |
| 2015/0319170 A1* | 11/2015 | Grossemy | H04L 63/0861 |
| | | | 713/186 |
| 2016/0078430 A1* | 3/2016 | Douglas | H04L 63/08 |
| | | | 705/43 |
| 2016/0261413 A1* | 9/2016 | Kirsch | H04L 9/30 |
| 2017/0019396 A1* | 1/2017 | Bettenburg | H04L 63/0428 |
| 2017/0041296 A1* | 2/2017 | Ford | G06F 16/951 |
| 2017/0085558 A1* | 3/2017 | Ibrahim | G06Q 20/385 |
| 2017/0171200 A1* | 6/2017 | Bao | H04L 63/0876 |
| 2018/0039990 A1* | 2/2018 | Lindemann | G06K 9/00892 |
| 2018/0063134 A1* | 3/2018 | Petrovykh | H04L 63/102 |
| 2018/0137512 A1* | 5/2018 | Georgiadis | G06Q 50/184 |
| 2018/0212959 A1* | 7/2018 | Mukherjee | H04L 63/205 |
| 2018/0218121 A1* | 8/2018 | Gassner | G06Q 30/018 |
| 2018/0270067 A1* | 9/2018 | Woo | H04L 9/32 |
| 2018/0337907 A1* | 11/2018 | Bhansali | H04L 63/102 |
| 2019/0066063 A1* | 2/2019 | Jessamine | G06F 21/31 |
| 2019/0068608 A1* | 2/2019 | Boland | G06F 16/252 |
| 2019/0098009 A1* | 3/2019 | Lee | H04L 63/108 |
| 2019/0149541 A1* | 5/2019 | Valenti | G06Q 20/36 |
| | | | 713/186 |
| 2019/0164156 A1* | 5/2019 | Lindemann | H04L 9/0894 |
| 2019/0199729 A1* | 6/2019 | Yared | H04L 63/101 |
| 2019/0222424 A1* | 7/2019 | Lindemann | H04L 9/0861 |
| 2019/0273615 A1* | 9/2019 | Gordon | H04W 12/069 |
| 2019/0281046 A1* | 9/2019 | Xu | H04L 63/0876 |
| 2019/0332754 A1* | 10/2019 | Andersen | G06K 9/00892 |
| 2020/0145418 A1* | 5/2020 | Taugbol | H04L 63/083 |
| 2020/0204543 A1* | 6/2020 | Lee | H04L 63/083 |
| 2020/0279255 A1* | 9/2020 | Douglas | G06Q 20/18 |

FOREIGN PATENT DOCUMENTS

| | | |
|---|---|---|
| CN | 103618717 A | 3/2014 |
| CN | 105450637 A | 3/2016 |
| CN | 105740693 A | 7/2016 |
| CN | 106296199 A | 1/2017 |
| CN | 106487760 A | 3/2017 |
| CN | 107093066 A | 8/2017 |
| CN | 107294916 A | 10/2017 |
| CN | 108259431 A | 7/2018 |

OTHER PUBLICATIONS

Written Opinion of the International Search Authority in International Application No. PCT/CN2019/091178, dated Sep. 6, 2019.
Extended European Search Report in European Application No. 19838309.3, dated Jun. 7, 2021.

* cited by examiner

IDENTITY VERIFICATION AND LOGIN METHODS, APPARATUSES, AND COMPUTER DEVICES

CROSS-REFERENCE TO RELATED APPLICATIONS

This application is a continuation application of International Application No. PCT/CN2019/091178, filed on Jun. 14, 2019, which is based upon and claims priority to Chinese Patent Application No. 201810791637.5, filed on Jul. 18, 2018, the entire content of all of which is incorporated herein by reference.

TECHNICAL FIELD

The present specification relates to the field of Internet technology, and in particular, to identity verification and login methods, apparatuses, and computer devices.

BACKGROUND

The Internet has become an important part of people's lives, and users can obtain various services (such as shopping, entertainment, content, socializing, etc.) through the Internet. With the rapid expansion of Internet services, there are various forms and types of Internet products for the users, and the users may need to manage a large number of accounts of websites or applications, which may lead to high maintenance costs.

SUMMARY

According to a first aspect of embodiments of the present specification, a login method includes: after a login process of a service apparatus is triggered, acquiring, by the service apparatus, verification information of a target primary account, and sending the verification information to an identity management apparatus; after receiving the verification information by the identity management apparatus, performing identity verification on the target primary account by using an identification information set of a registered primary account, and after the identity verification is passed, acquiring login information of at least one sub-account associated for the service apparatus in advance with the target primary account and sending the login information to the service apparatus; and determining, by the service apparatus, a target sub-account based on the login information and logging in to a server side.

According to a second aspect of the embodiments of the present specification, an identity management apparatus includes: a processor; and a memory storing instructions executable by the processor, wherein the processor is configured to: receive verification information of a target primary account sent by a service apparatus, perform identity verification on the target primary account by using an identification information set of a registered primary account, and after the identity verification is passed, acquire login information of at least one sub-account associated for the service apparatus in advance with the target primary account and send the login information to the service apparatus, wherein the sub-account is used for the service apparatus to log in to a server side.

According to a third aspect of the embodiments of the present specification, a service apparatus includes: a processor; and a memory storing instructions executable by the processor, wherein the processor is configured to: after a login process of the service apparatus is triggered, acquire verification information of a target primary account and send the verification information to an identity management apparatus; receive login information of at least one sub-account sent by the identity management apparatus; and determine a target sub-account based on the login information and log in to a server side.

According to a fourth aspect of the embodiments of the present specification, an identity verification method includes: receiving verification information of a target primary account sent by a service apparatus; performing identity verification on the target primary account by using an identification information set corresponding to a registered primary account, wherein the registered primary account is associated with at least one sub-account for at least one service apparatus in advance, and the sub-account is used for the service apparatus to log in to a server side; and after the identity verification is passed, acquiring login information of the at least one sub-account associated for the service apparatus in advance with the target primary account and sending the login information to the service apparatus.

According to a fifth aspect of the embodiments of the present specification, a login method includes: after a login process is triggered, acquiring verification information of a target primary account and sending the verification information to an identity management apparatus; receiving login information of at least one sub-account sent by the identity management apparatus; and determining a target sub-account from the at least one sub-account and logging in to a server side.

The technical solution provided by the embodiments of the present specification may include the following beneficial effects.

In the embodiments of the present specification, the identity management apparatus is used for unified management of user identities. The apparatus may be independent of other service parties and may not be bound to service apparatuses of the service parties. A user may register a primary account which is used to log in to the identity management apparatus, and meanwhile, one or more sub-accounts may be associated based on the primary account, wherein the sub-accounts correspond to various service parties and are used for the service apparatus to log in to a server side. Based on the above solution, when the user logs in to the service apparatus, the identity management apparatus performs identity verification on the user's primary account, and after the verification is passed, at least one of the sub-accounts associated for the service apparatus in advance is used to log in to the server side.

Based on this, the user may only need to remember the primary account and identification information to log in to a plurality of different service apparatuses, and the user can associate a plurality of sub-accounts for the service apparatus to meet personalized needs of the user; and on the other hand, because the sub-accounts used to log in to the service apparatus are associated with the primary account, they can be traced back to the primary account on the identity management apparatus side according to their identities, thereby providing security for the network.

It should be understood that the above general description and the following detailed description are only exemplary and explanatory, and do not limit this specification.

BRIEF DESCRIPTION OF THE DRAWINGS

The drawings herein are incorporated into the specification and constitute a part of the present specification, show embodiments consistent with the specification, and are used to explain the principles of the specification together with the specification.

DETAILED DESCRIPTION

Figure 1A:
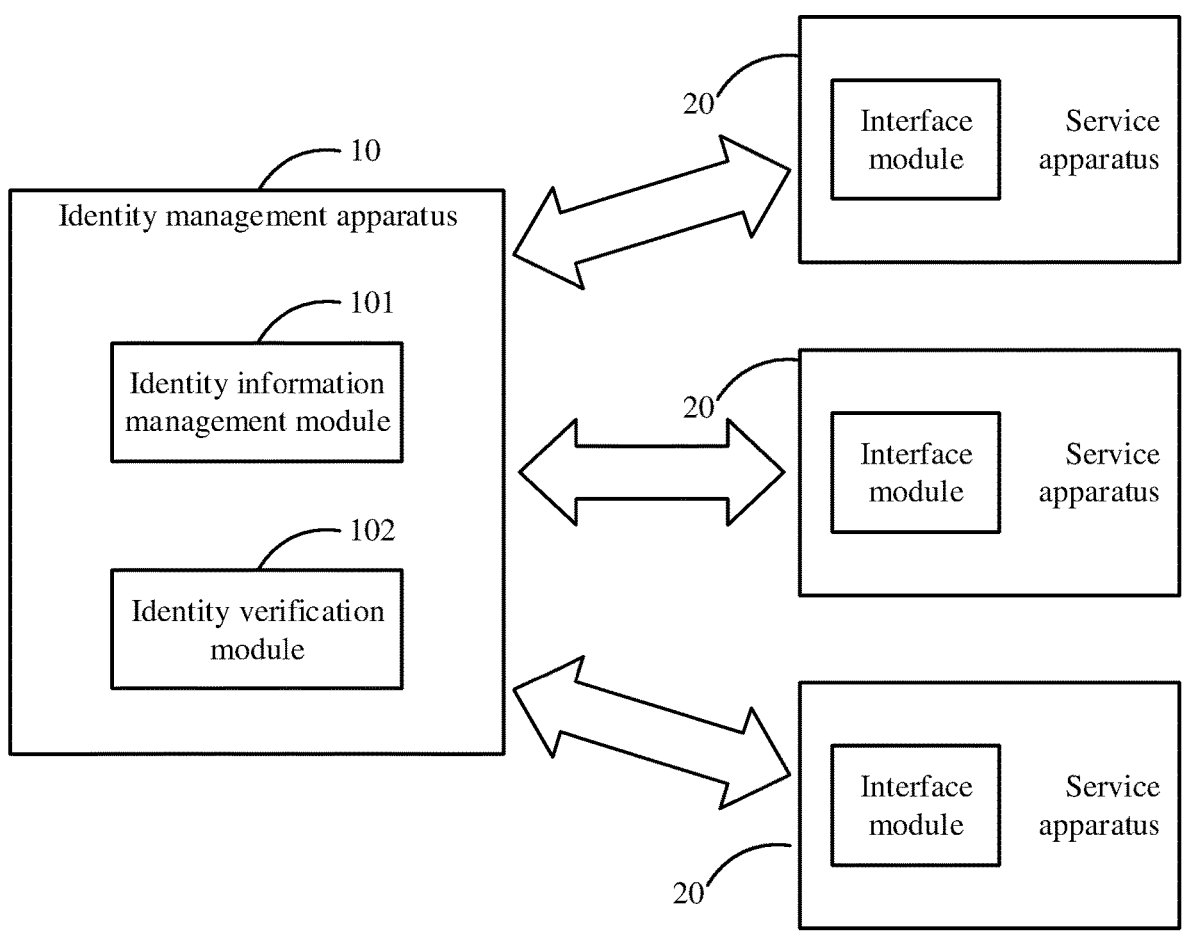
FIG. 1A is a schematic diagram of an identity management and login system according to an embodiment.

Embodiments will be described in detail here, examples of which are shown in the drawings. When the following description refers to the accompanying drawings, unless otherwise indicated, the same numerals in different drawings represent the same or similar elements. The implementations described in the following example embodiments do not represent all implementations consistent with the specification. Rather, they are only examples of apparatuses and methods consistent with some aspects of the specification as recited in the appended claims.

Terms used in the specification are for describing specific examples only, and are not intended to limit the specification. For example, the term "if" used herein may be interpreted as "when," or "while," or "in response to a determination," depending on the context.

There are more and more Internet service products. Accordingly, users may need to manage a large number of accounts of websites or applications, and maintenance costs may be high. As Internet products are being frequently developed and due to service quality and users' own reasons, the users may, at different periods, use different login names, email addresses, and mobile phone numbers, or set different security information such as security questions. Over time, problems may occur, such as the users forget early accounts and the like.

Based on this, embodiments of the specification provide an identity verification and login solution. FIG. 1A is a schematic diagram of an identity management and login system according to an embodiment. Referring to FIG. 1A, the system may include an identity management apparatus 10 arranged by an identity management party and one or more service apparatuses 20 (client sides) interfacing with the identity management apparatus 10. The service apparatuses 20 may be provided by a service party, such as an application (APP) developer, and may include computer programs and the like that can be installed on terminal devices such as smartphones or personal computers.

In an embodiment, the identity management apparatus 10 may include a server side deployed on a server, a service cluster, or a cloud server, configured by the identity management party, and may also include a client side installed on a user device. The client side may cooperate with the server side to perform an identity management method described below.

In an embodiment, the identity management apparatus 10 may include: an identity information management module 101 configured to: manage a registered primary account and at least one sub-account associated for at least one service apparatus with the registered primary account, wherein the registered primary account corresponds to an identification information set, and the sub-account is used for the service apparatus to log in to the server side; and an identity verification module 102 configured to: receive verification information of a target primary account sent by an interface module of a service apparatus 20, perform identity verification on the target primary account by using the identification information set, and after the identity verification is passed, acquire login information of the at least one sub-account associated for the service apparatus 20 in advance by the target primary account and send the login information to the interface module.

Figure 1B:
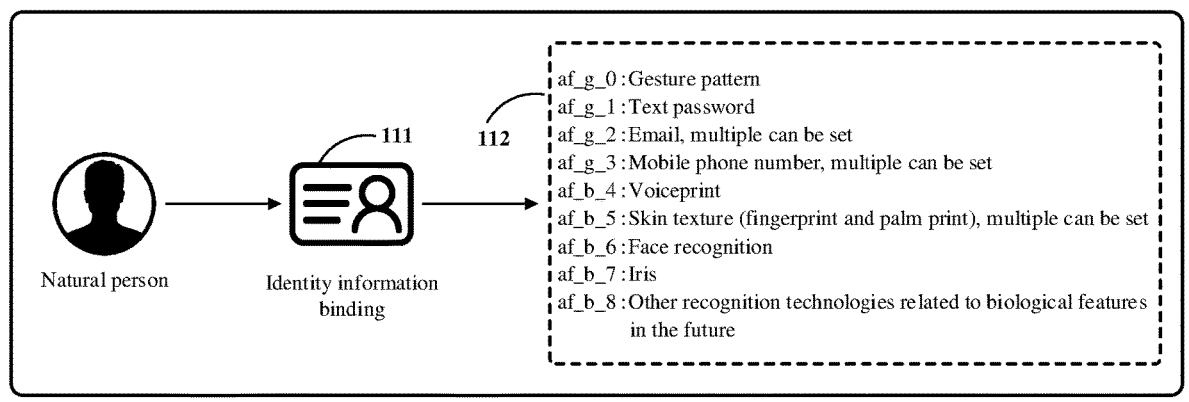
FIG. 1B is a schematic diagram of registration of a primary account by a user according to an embodiment.

In an embodiment, the identity management apparatus 10 is used for unified management of user identities. The identity management apparatus 10 may be independent of other service parties and may not be bound to service apparatuses of the service parties. The primary account managed by the identity management apparatus 10 may be an account of a natural person. For example, as shown in FIG. 1B, a user can register a primary account of the user in an identification device using a valid and legal identity document. After registration, the user can bind identification information with the primary account (111). In an embodiment, three or more pieces of identification information 112 can be bound. The identification information 112 may include network identification information, personal identification information, biometric information, etc.

The network identification information may include: account names, account nicknames, passwords, mobile phone numbers, email addresses, password protection questions and answers, etc.

The personal identification information may include identity document numbers, passport numbers, or driver license numbers.

The biometric information may include fingerprint information, iris information, face information, voiceprint information, information related to biological features in the future, etc.

In the embodiment, the identification information bound by the user may constitute an identification information set. In the case where identity verification is required, the identity management system may perform user identity verification based on one or more pieces of identification information in the identification information set.

In an embodiment, the user can also add other security information such as emergency contacts and security questions, and other optional information such as interests and hobbies, into the identification information set.

In the foregoing embodiments, the identity management apparatus 10 may serve as a centralized identity management center, each user (natural person) corresponds to a set of identification information, and there may be only one primary account. In an embodiment, each natural person has a unique identity document (personal identity document, passport or driver license), the primary account may be bound to identity document information of the corresponding user, and an identification of the primary account may be associated with the identity document information of the corresponding user. For example, an identity document number may be used as the identification of the primary account, and other identifiers may also be added based on the identity document number as the identification of the primary account.

Figure 1C:
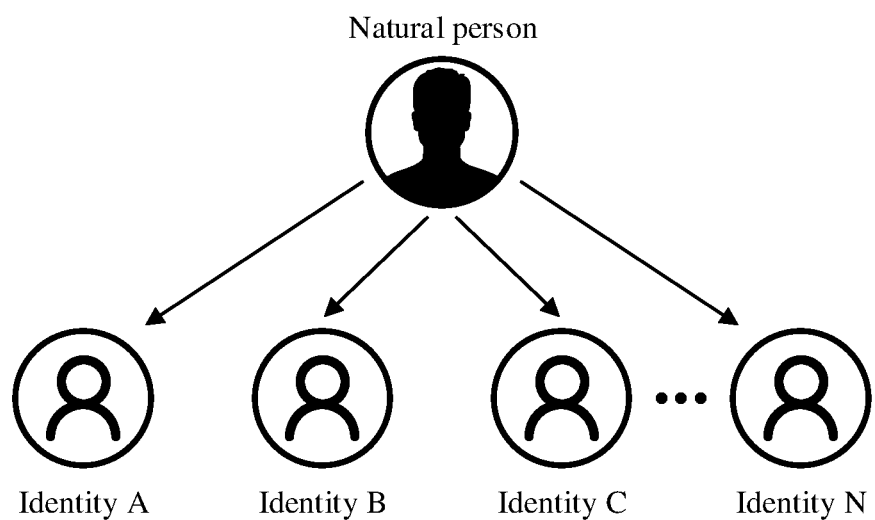
FIG. 1C is a schematic diagram of a primary account and a sub-account of a user according to an embodiment.

In an embodiment, one or more sub-accounts may be associated with the primary account, and one sub-account may correspond to one or more service apparatuses for the service apparatuses to log in to the server side. FIG. 1C is a schematic diagram of a relationship between a user and a plurality of sub-accounts according to an embodiment. The sub-accounts may be understood as characters or virtual identities. For example, the natural person in FIG. 1C can correspond to N virtual identities adopted by the user when products from different service parties are used. Each sub-account may correspond to one type of service apparatus, and the user may associate one or more sub-accounts for one service apparatus. The user may associate the sub-accounts in the identity management system, or may associate the sub-accounts on the service party side. In the process of associating the sub-accounts, the user may log in to the primary account of the identity management system, then associate the sub-accounts based on the primary account, and may also set sub-account information such as avatars, nicknames, etc., and generate sub-account identifications, and so on.

After the sub-accounts are associated with the primary account, the user may log in to the service apparatus as follows: identity verification is performed on the primary account of the user at the service side, and after the identity verification is passed, one of the sub-accounts associated for the service apparatus in advance with the primary account is used to log in to the server side.

Figure 2A:
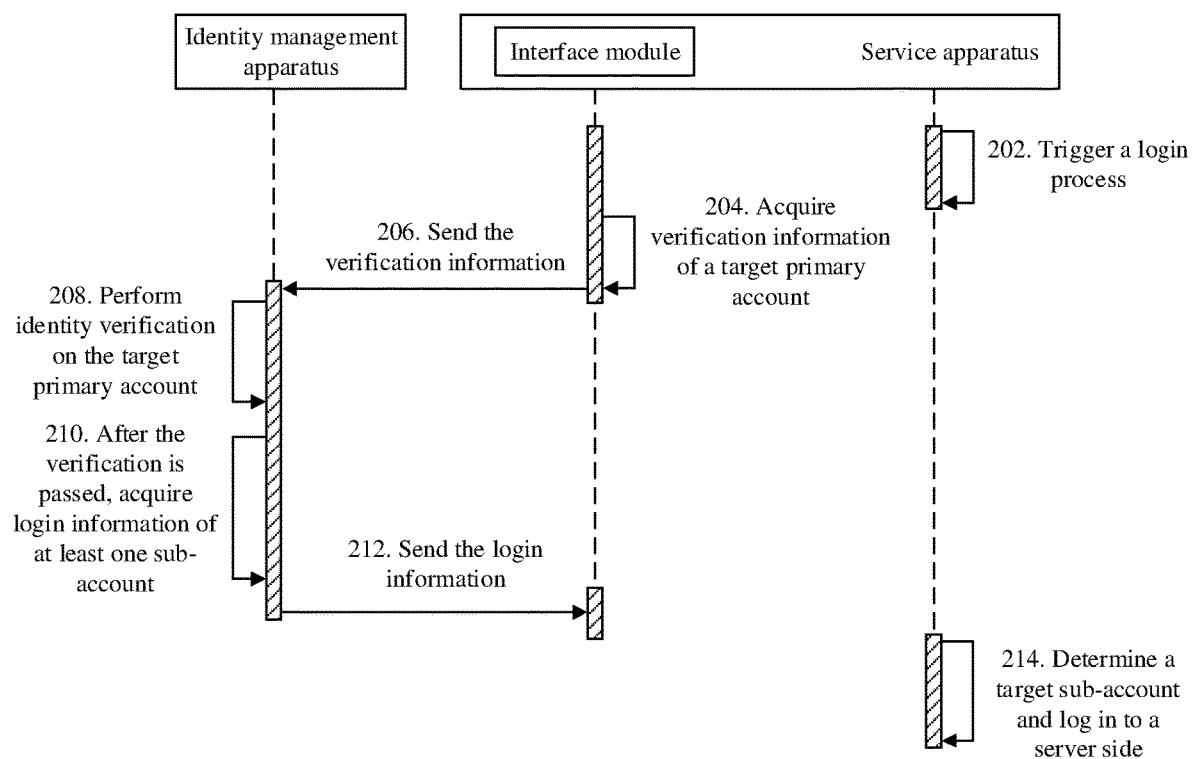
FIG. 2A is a flowchart of a login method according to an embodiment.

FIG. 2A is a flowchart of a login method according to an embodiment. As shown in FIG. 2A, the login method includes the following steps.

In step 202, a login process of a service apparatus is triggered.

In step 204, verification information of a target primary account is acquired by an interface module in the service apparatus.

In step 206, the interface module sends the verification information to an identity management apparatus.

In step 208, the identity management apparatus receives the verification information, and performs identity verification on the target primary account by using an identification information set of a registered primary account.

In step 210, after the identity verification is passed, the identity management apparatus acquires login information of at least one sub-account associated for the service apparatus in advance with the target primary account.

In step 212, the identity management apparatus sends the login information to the interface module.

In step 214, after the interface module receives the login information, the service apparatus determines a target sub-account and logs in to a server side.

Figure 2B:
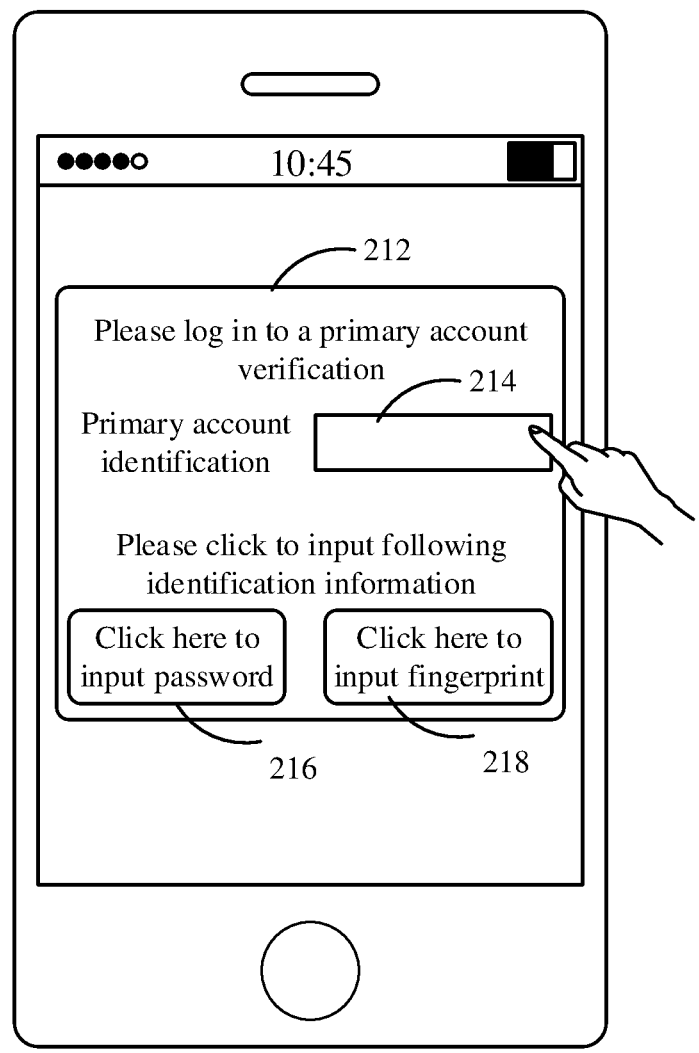
FIG. 2B is a schematic diagram of user registration on an application according to an embodiment.

FIG. 2B is a schematic diagram of an interface for a user to log in to the server side on a service apparatus according to an embodiment. For example, the service apparatus may correspond to an APP installed on a smartphone. When the user clicks a login option (not shown in FIG. 2B) on the APP, the login process of the service apparatus is triggered. As shown in FIG. 2B, an identity management system needs to perform identity verification on a primary account of the user first.

In an embodiment, the interface module in the service apparatus may show a verification information acquisition interface 212 of the target primary account in an application interface of the service apparatus. For example, in FIG. 2B, an input box 214 of a primary account identification, as well as an "click here to input password" option 216 and an "click here to input fingerprint" option 218 are shown. The verification information is used to verify the primary account of the user who needs to log in currently, and may include an identification of the target primary account and at least one type of identification information. The user may input the primary account identification and the identification information through the above verification information acquisition interface.

The interface module in the service apparatus may perform data interaction with the identity management apparatus. In some embodiments, the identity management apparatus and the service apparatus are provided by different manufacturers, and the two directly perform data interaction with each other, so the two parties may need to disclose an information transmission protocol to each other to achieve data interaction. However, the disclosure of the information transmission protocol by both parties may reduce the security. Therefore, the interface module in the present embodiment may be provided by an identity management party to a service party, specific functions of the interface module are provided by the identity management party, while the identity management party does not need to disclose a relatively large number of data transmission protocols to the service party. After the interface module is provided to the service party, it can be integrated by the service party as a sub-module of the service apparatus to perform data interaction with the identity management apparatus, thereby reducing security risks and reducing the development cost and difficulty of the service party.

In the above embodiments, one or more pieces of identification information in the identification information set of the primary account may be used for identity verification. It can be understood that each piece of identification information has a different importance or security. For example, biometric information is unique, difficult to decipher, and difficult to steal. The biometric information involves the user's fingerprint, iris, and other personal biological characteristics, thereby having a relatively high security level. While email addresses, passwords, etc. can be changed and are not difficult to decipher and steal, and the security level is lower than that of the biometric information. In the present embodiment, the identification information used for verification may be flexibly configured as required in actual applications.

Figure 2C:
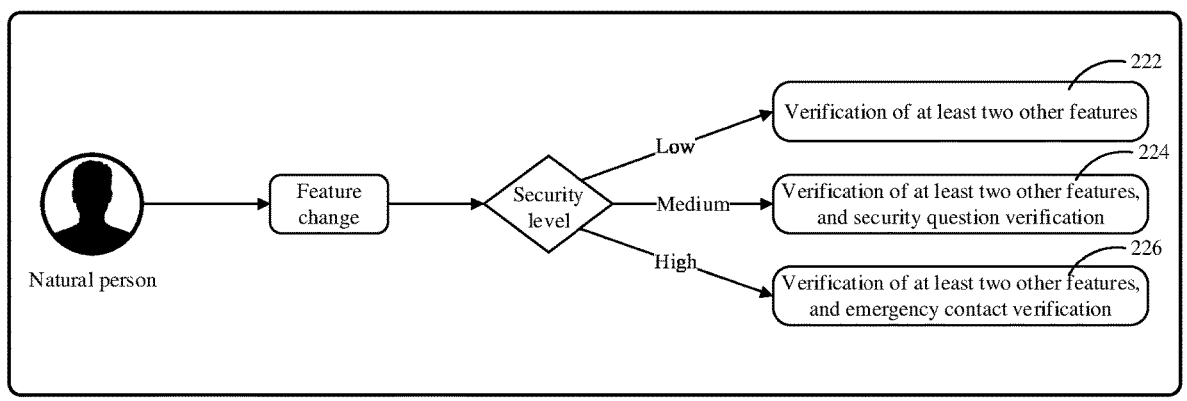
FIG. 2C is a schematic diagram of change of identification information by a user according to an embodiment.

In an embodiment, if the user's identification information is lost or needs to be changed, or new identification information needs to be added, the user can log in to an identification system to manage the identification information. As an example, identification features may be divided into multiple security levels according to factors such as difficulty of decipherment and stealing. Taking the three security levels of high, medium, and low as an example, as shown in FIG. 2C, a processing process of changing the identification information may include: an operation 222 to change low security level features: verification of at least two other features needs to be passed; an operation 224 to change medium security level features: verification of at least two other features needs to be passed, and verification of security questions needs to be passed; or an operation 226 to change high security level features: verification of at least two other features needs to be passed, and consent of an emergency contact is obtained at the same time.

Figure 2D:
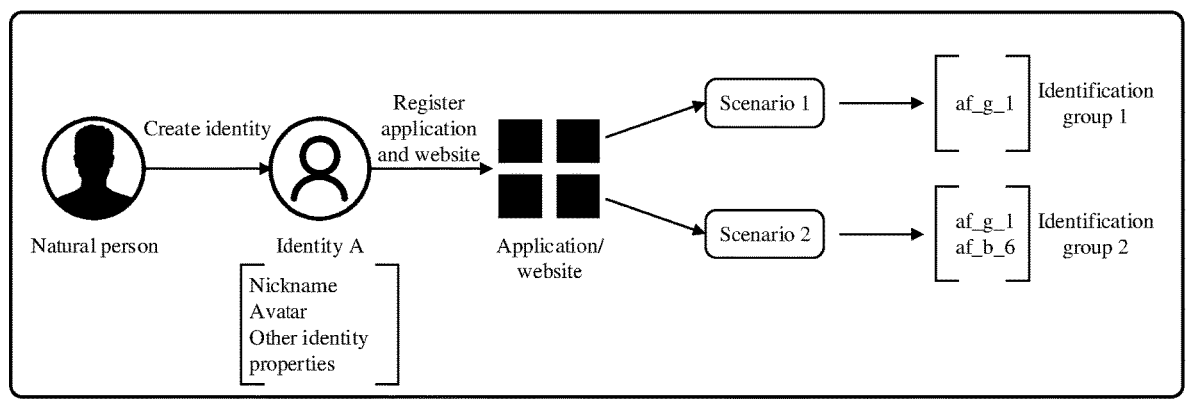
FIG. 2D and FIG. 2E are schematic diagrams of different identification information subsets under different scenarios according to an embodiment.
Figure 2E:
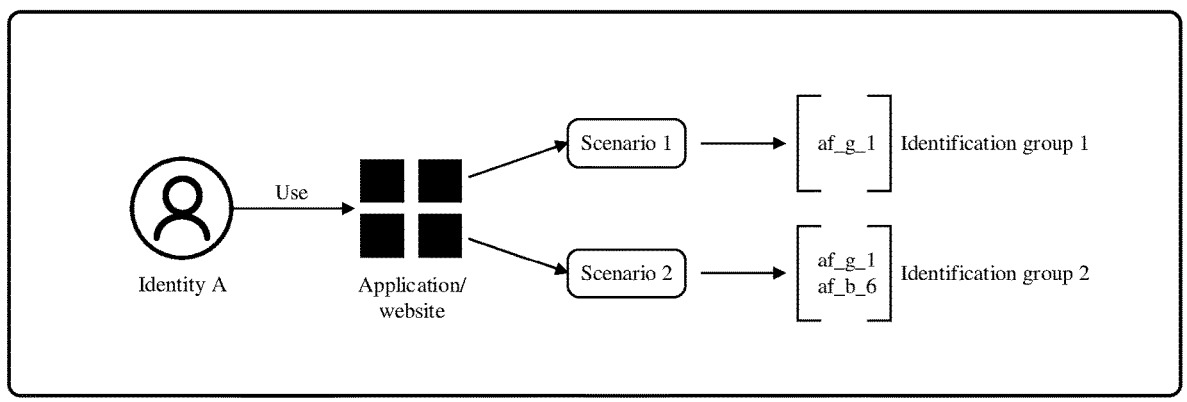

Different Internet services may have different security requirements. Some Internet services have higher security requirements, such as payment and other related services; while a login process of some Internet services can slightly lower security requirements. Based on this, in an embodiment, as shown in FIG. 2D and FIG. 2E, a user (natural person) is associated with a sub-account (identity A), identity A can be used for registration on an application or a website, and different identification information can be flexibly set according to different scenarios, which is referred to as identification information subsets in the present embodiment. For example, some audio-visual services may use an identification information subset with a lower security level. As shown in FIG. 2D and FIG. 2E, scenario 1 corresponds to an identification information subset (identification group 1 is used as an example in the figures, and included identification information is af_g_1). Some payment services may use an identification information subset with a higher security level. As shown in FIG. 2D and FIG. 2E, scenario 2 corresponds to an identification information subset (identification group 2 is used as an example in the figure, and included identification information is af_g_1 and af_b_6). Each identification information subset is composed of one or more pieces of identification information in the identification information set. Which identification information subsets are specifically used by which service apparatuses may be determined by the service parties corresponding to the service apparatuses, or specified by the user, or specified by the identity management system, and may be flexibly configured in practical applications, which is not limited in the present embodiment.

Taking the embodiment shown in FIG. 2B as an example, the service apparatus involves online shopping. In this scenario, the security level required by the service apparatus is relatively high, and the interface module of the service apparatus may require the user to input the following identification information: a password, a fingerprint, etc.

Based on this, the interface module may acquire the verification information of the target primary account input by the user, and send the verification information to the identity management apparatus for identity verification. The identity management apparatus receives the verification information of the target primary account sent by the interface module of the service apparatus, and performs the identity verification on the target primary account by using the identification information set. If the verification is passed, the identity management apparatus may acquire login information of at least one sub-account associated for the service apparatus in advance with the target primary account, and send the login information to the interface module. In an embodiment, the target primary account is associated with two sub-accounts with respect to the service apparatus, and the service apparatus may display the sub-accounts to the user to select a sub-account that the user desires to log in to.

If the verification fails, the identity management apparatus may also send a verification result to the interface module, so that the interface module prohibits a login operation. In an embodiment, if multiple consecutive verifications fail in the same scenario within a preset time window, the following security measures may be taken: prohibiting the user from verifying again in this scenario within a preset period of time, or requiring a natural person to log in to the identification system to unlock through other verification methods, and so on. The identity management system may also configure other risk control strategies, and if it is determined that the user's verification environment is abnormal, for example, when the user is in a non-resident location and uses an unusual device, the interface module may further be notified to acquire more identification information of the user.

Figure 2F:
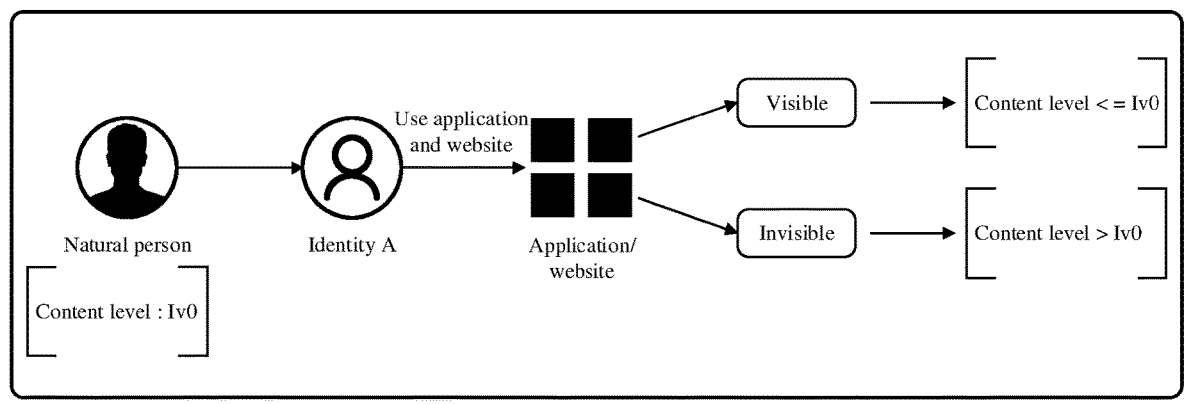
FIG. 2F is a schematic diagram of content rating according to an embodiment.

In the embodiments of the specification, the identity management apparatus manages the identity information of the user. In an embodiment, the service party side may acquire identity information such as the age or gender of the logged-in user. As an example, the interface module is also configured to receive content levels of the primary account corresponding to the target sub-account. Content level parameters may include personal information such as the age or gender of the primary account, or may be parameters agreed upon by the identity management party and the service party. Therefore, the service apparatus also includes a display module configured to determine displayed service contents according to the content levels and display the service contents. The service apparatus may filter contents that do not meet the user's content levels, and the contents include but are not limited to videos, audios, articles, or pictures. As shown in FIG. 2F, the content level of the user (natural person) is 1v0. After the user logs in to an application by using identity A, a service content with a content level less than or equal to 1v0 can be displayed, and a service content with a content level greater than 1v0 cannot be displayed and is in an invisible state. The service party may also recommend contents that may be of interest to the user based on the user's interests and hobbies.

Figure 2G:
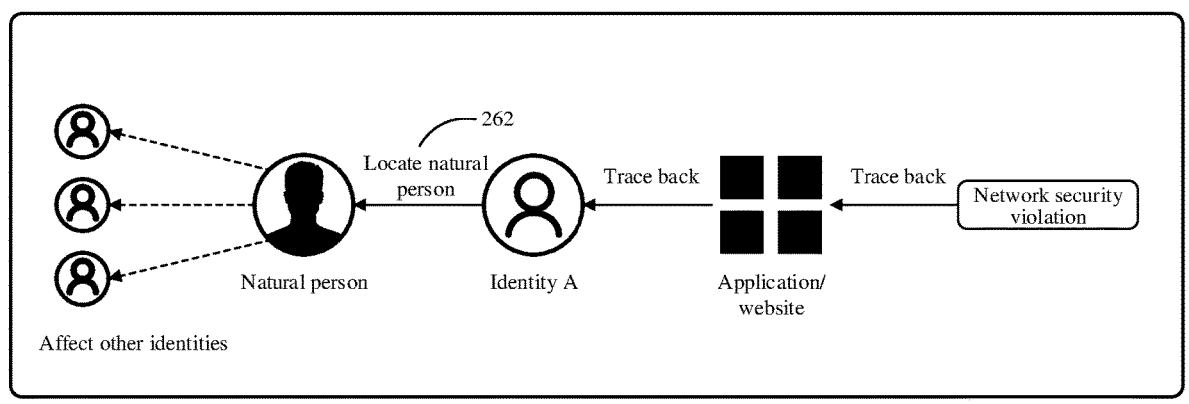
FIG. 2G is a schematic diagram of identity backtracking according to an embodiment.

Based on the identity management apparatus of the embodiments of the present specification, the security of Internet services can be improved. For example, as shown in FIG. 2G, since the sub-accounts used to log in to the service apparatus are associated with the primary account, the primary account (natural person) on the identity management apparatus side can be traced back according to the identity, and through a mapping relationship 262 between the primary account and the identity, malicious behaviors of the user on multiple Internet service sides can also be conveniently managed. In an embodiment, the identity management apparatus may further include a security control module configured to: acquire user behavior data sent by the service apparatus, and perform risk control based on the user behavior data. The identity management apparatus can analyze user behaviors according to feedback of various Internet services, and provide a basis for combating network security violations.

Figure 2H:
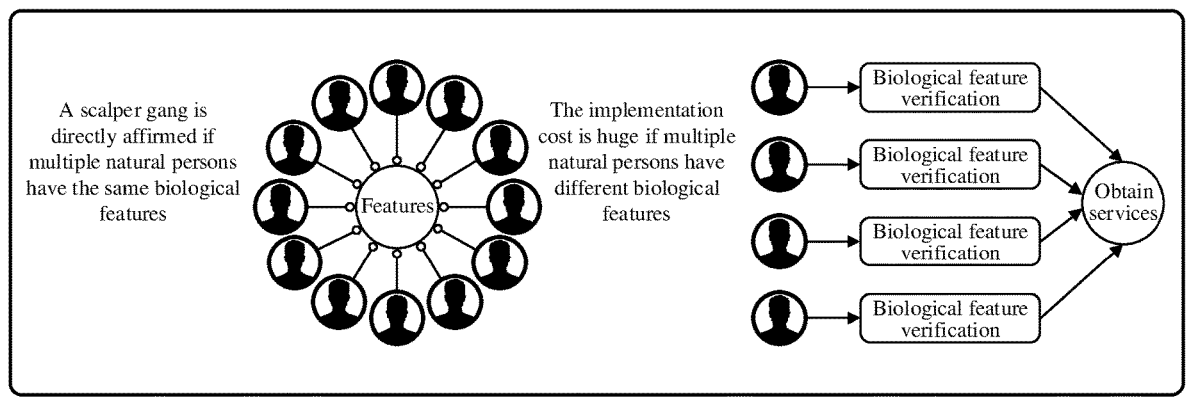
FIG. 2H is a schematic diagram of identifying a scalper gang according to an embodiment.

Taking online scalpers as an example, as shown in FIG. 2H, an online scalper gang can collect valid identity documents of a large number of natural persons to register natural person accounts, and earn benefits through click farming behaviors in various Internet scenarios such as discounts and rebates. In embodiments of the present specification, the service party may use biometric information to verify the identity of the primary account in scenarios such as discounts and rebates. In an embodiment, the identity management apparatus may further include a security control module configured to: in a primary account registration stage, perform risk control based on whether submitted identification information is the same as identification information of other registered primary accounts. For example, in the registration stage, if the scalper gang only collects valid identity documents and does not collect biometric information, then in the registration stage, if the scalper gang uses a large amount of the same biometric information as the identification information for registration, the identity management apparatus may receive, based on the identification information of the registered accounts, a large amount of identification information that is the same as that of the registered accounts, so risk control may be performed (for example, it can determine that illegal registration and scalper gangs have occurred), while in the process of identity verification, the use of biometric information can also greatly increase the cost of the scalper gangs.

In the above embodiments, the identity management apparatus serves as a centralized identity management center which can uniformly manage user identities. The primary account is established based on the user's personal identity (that is, each user may uniquely correspond to one primary account), so there will be no loss or abandonment, and the sub-accounts associated with the primary account will not be unable to continue to be used. A mobile phone number or an email address is only one piece of the identification information of the user's primary account. The service apparatus logged in to the service party is not directly associated with the mobile phone number. The user can freely change the mobile phone number or email address and other identification information.

The primary account of the user can be associated with a plurality of sub-accounts on the same service party side. The user can log in to a server of the service party by using the sub-accounts with different identities, which can meet the personalized needs of the user. The user can uniformly manage all the sub-accounts of all service apparatuses through the identity management apparatus. In addition, identification information subsets of different security levels may be flexibly set in different service scenarios to verify the user's identity. In the process of logging in to the service apparatus, the identification information of the user is decoupled from the service party side, and the identity management apparatus verifies the user's identity.

Figure 3:
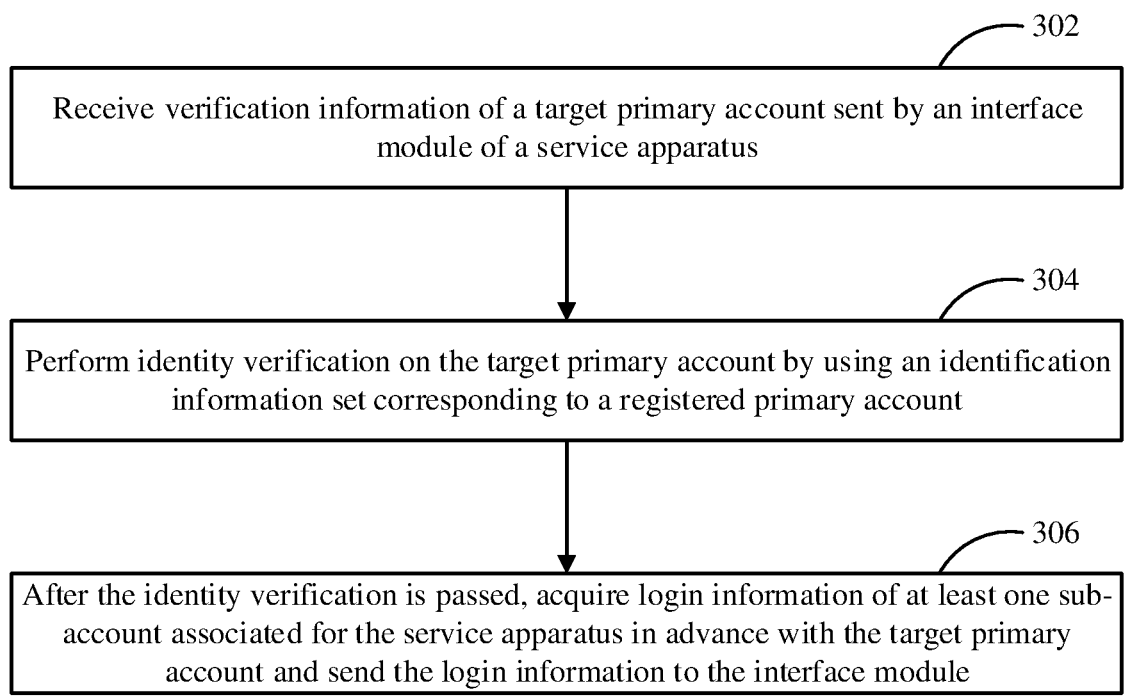
FIG. 3 is a flowchart of a login method according to an embodiment.

FIG. 3 is a flowchart of an identity verification method according to an embodiment. For example, the method may be applied to an identity management apparatus and include the following steps.

In step 302, verification information of a target primary account sent by an interface module of a service apparatus is received.

In step 304, identity verification is performed on the target primary account by using an identification information set corresponding to a registered primary account. The registered primary account is associated with at least one sub-account for at least one service apparatus in advance, and the sub-account is used for the service apparatus to log in to a server side.

In step 306, after the identity verification is passed, login information of the at least one sub-account associated for the service apparatus in advance with the target primary account is acquired and sent to the interface module.

Figure 4:
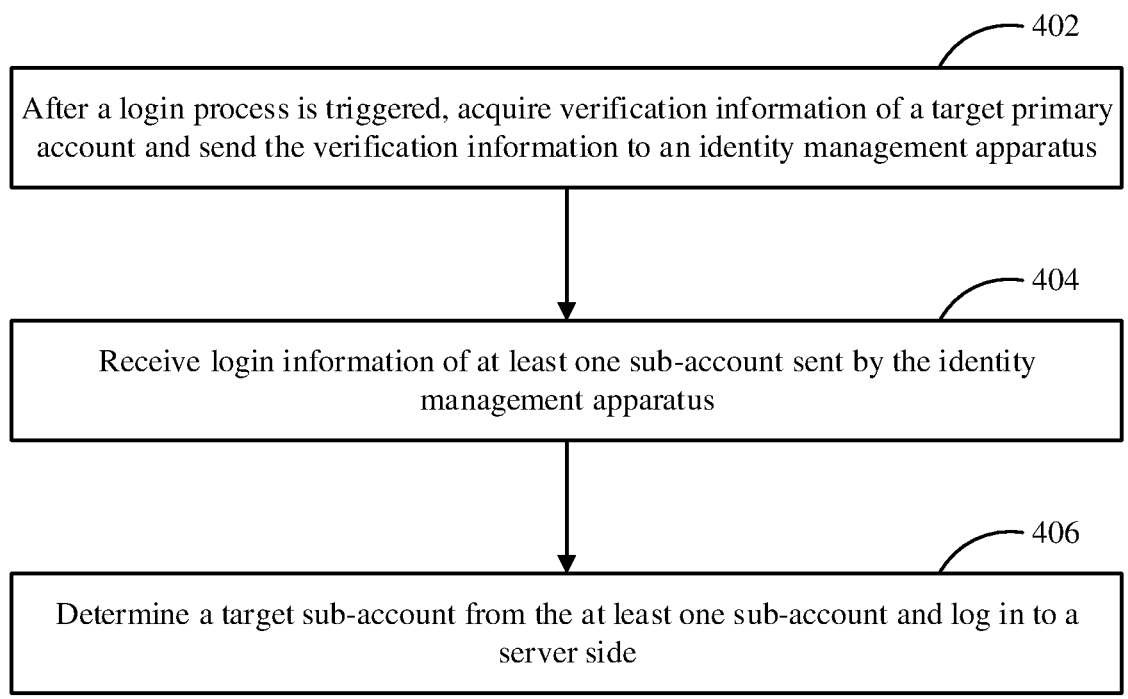
FIG. 4 is a flowchart of a login method according to an embodiment.

FIG. 4 is a flowchart of a login method according to an embodiment. For example, the method may be applied to a service apparatus and include the following steps.

In step 402, after a login process is triggered, verification information of a target primary account is acquired and sent to an identity management apparatus.

In step 404, login information of at least one sub-account sent by the identity management apparatus is received.

In step 406, a target sub-account is determined from the at least one sub-account and a server side is logged in.

Embodiments of the present specification further provide a computer device including a processor and a memory storing a computer program executable by the processor, wherein the following method is implemented when the processor executes the program: verification information of a target primary account sent by an interface module of a service apparatus is received; identity verification is performed on the target primary account by using an identification information set corresponding to a registered primary account, wherein the registered primary account is associated with at least one sub-account for at least one service apparatus in advance, and the sub-account is used for the service apparatus to log in to a server side; and after the identity verification is passed, login information of the at least one sub-account associated for the service apparatus in advance with the target primary account is acquired and sent to the interface module.

Embodiments of the present specification further provide a computer device including a processor and a memory storing a computer program executable by the processor, wherein the following method is implemented when the processor executes the program: after a login process is triggered, verification information of a target primary account is acquired and sent to an identity management apparatus; login information of at least one sub-account sent by the identity management apparatus is received; and a target sub-account is determined from the at least one sub-account and a server side is logged in.

The service apparatus and the identity management apparatus in the present specification may be implemented by a computer device, which may be, e.g., a server or a terminal device. In an embodiment, the service apparatus and the identity management apparatus may be implemented by the same computer device. In an embodiment, the service apparatus and the identity management apparatus may be implemented by different computer devices.

Figure 5:
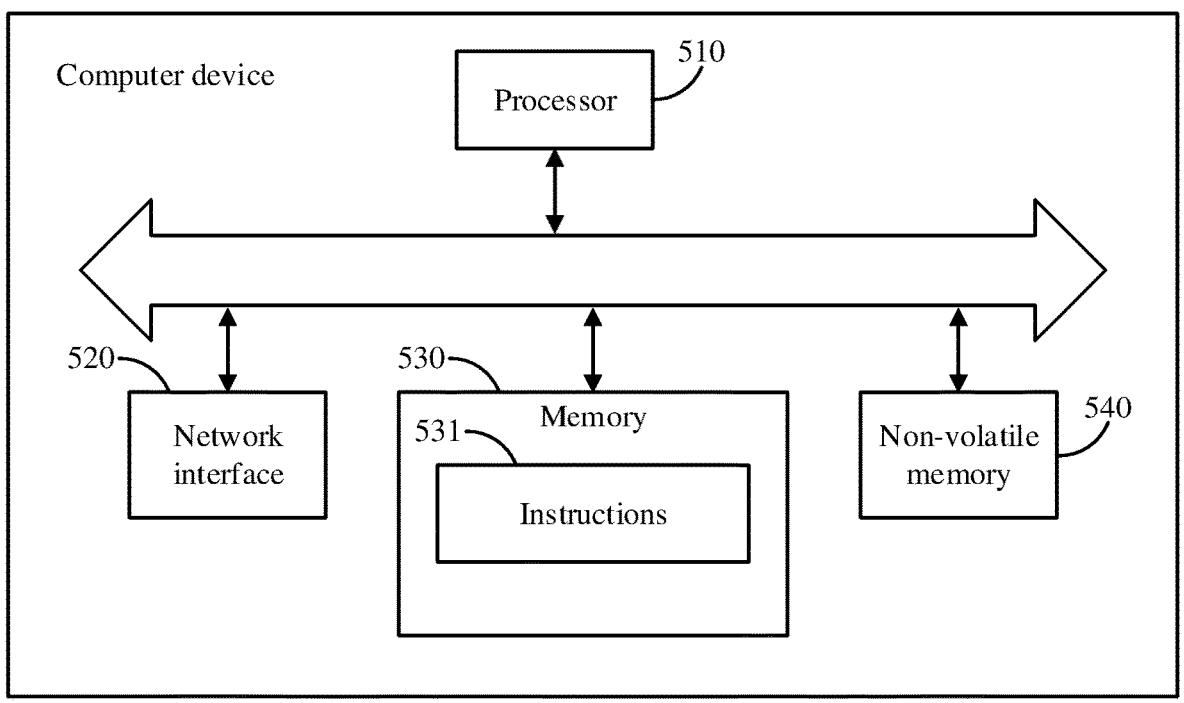
FIG. 5 is a schematic diagram of a computer device according to an embodiment.

The service apparatus and the identity management apparatus may each be implemented by software, or hardware, or a combination of hardware and software. Taking software implementation as an example, as an apparatus in a logical sense, it is formed by reading a corresponding computer program instruction in a non-volatile memory into a memory for running through a processor for file processing in which the apparatus is located. In terms of hardware, FIG. 5 is a schematic diagram of a computer device to implement the service apparatus or the identity management apparatus according to embodiments of the present specification. Referring to FIG. 5, the computer device may include a processor 510, a memory 530, a network interface 520, and a non-volatile memory 540. The processor 510, when executing instructions 531 stored in the memory 530 for implementing the service apparatus/identity management apparatus, may perform the methods described above.

In the above embodiments, the modules described as separate components may or may not be physically separated, and the components displayed as modules may or may not be physical modules, that is, may be located in one place, or may be distributed on a plurality of networks. Some or all of the modules can be selected according to actual needs.

The steps of the methods described above do not necessarily require the particular order shown in the drawings or a sequential order to achieve the desired results. In certain implementations, multitasking and parallel processing may be advantageous.

Other implementations of the embodiments will be apparent to those skilled in the art from consideration of the specification. The present specification is intended to cover any variations, uses, or adaptations of the present specification following the general principles of the present specification and including common general knowledge or conventional technical means in the technical field. The embodiments are to be considered examples only, and the true scope and spirit of the present specification are indicated by the following claims.

It should be understood that the present specification is not limited to the precise structure that has been described above and shown in the drawings, and that various modifications and changes can be made without departing from the scope thereof. The scope of the present specification is limited only by the appended claims.

The invention claimed is:

1. A login method, comprising:
    after a login process of a service apparatus is triggered, acquiring verification information of a target primary account, and sending the verification information to an identity management apparatus, wherein the verification information comprises an identification of the target primary account and at least one type of identification information;
    after receiving the verification information by the identity management apparatus, performing identity verification on the target primary account by using an identification information set of a registered primary account, and after the identity verification is passed, acquiring login information of at least one sub-account associated for the service apparatus in advance with the target primary account and sending the login information of the at least one sub-account to the service apparatus; and
    determining, by the service apparatus, a target sub-account based on the login information of the at least one sub-account to log in to a server side, wherein determining the target sub-account comprises: in response to receiving login information of a plurality of sub-accounts, displaying the plurality of sub-accounts, and acquiring a sub-account selected by a user as the target sub-account.

2. The method according to claim 1, wherein the identification of the target primary account is associated with an identity document number of a user corresponding to the target primary account.

3. The method according to claim 1, wherein the at least one type of identification information comprised in the verification information is determined based on a security level of the service apparatus.

4. The method according to claim 1, wherein the identification information set of the registered primary account includes one or more of:
    network identification information, personal identification information, or biometric information.

5. An identity management apparatus, comprising:
    a processor; and
    a memory storing instructions executable by the processor,
    wherein the processor is configured to:
    receive verification information of a target primary account sent by a service apparatus, wherein the verification information comprises an identification of the target primary account and at least one type of identification information;
    perform identity verification on the target primary account by using an identification information set of a registered primary account; and
    after the identity verification is passed, acquire login information of at least one sub-account associated for the service apparatus in advance with the target primary account and send the login information of the at least one sub-account to the service apparatus, wherein the login information of the at least one sub-account is configured for the service apparatus to determine a target sub-account to log in to a server side, wherein determining the target sub-account comprises: in response to receiving login information of a plurality of sub-accounts, displaying the plurality of sub-accounts, and acquiring a sub-account selected by a user as the target sub-account.

6. The identity management apparatus according to claim 5, wherein the registered primary account is bound to identity document information of a user corresponding to the registered primary account.

7. The identity management apparatus according to claim 5, wherein the sub-account corresponds to an identification information subset for identity verification, and the identification information subset is determined based on a security level of the service apparatus.

8. The identity management apparatus according to claim 5, wherein the identification information set comprises one or more of: network identification information, personal identification information, or biometric information.

9. The identity management apparatus according to claim 5, wherein the processor is further configured to: determine content level parameters of the registered primary account based at least on an age of the registered primary account, and send the content level parameters to the service apparatus.

10. The identity management apparatus according to claim 5, wherein the processor is further configured to:
    acquire user behavior data sent by the service apparatus, and perform risk control based on the user behavior data.

11. The identity management apparatus according to claim 5, wherein the processor is further configured to:
    in a primary account registration stage, perform risk control based on whether submitted identification information matches identification information of other registered primary accounts.

12. A service apparatus, comprising:
    a processor; and
    a memory storing instructions executable by the processor,
    wherein the processor is configured to:
    after a login process of the service apparatus is triggered, acquire verification information of a target primary account and send the verification information to an identity management apparatus, wherein the verification information comprises an identification of the target primary account and at least one type of identification information;
    receive login information of at least one sub-account sent by the identity management apparatus; and
    determine a target sub-account based on the login information of the at least one sub-account to log in to a server side, wherein determining the target sub-account comprises: in response to receiving login information of a plurality of sub-accounts, displaying the plurality of sub-accounts, and acquiring a sub-account selected by a user as the target sub-account.

13. The service apparatus according to claim 12, wherein an identification of the target primary account is associated with an identity document number of a user corresponding to the target primary account.

14. The service apparatus according to claim 13, wherein at least one type of identification information comprised in the verification information is determined based on a security level of the service apparatus.

15. The service apparatus according to claim 12, wherein the processor is further configured to receive content level parameters of the target primary account corresponding to the target sub-account; and determine service contents according to the content level parameters and display the service contents.

\* \* \* \* \*